US010313540B2

(12) United States Patent
Sato

(10) Patent No.: US 10,313,540 B2
(45) Date of Patent: Jun. 4, 2019

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Haruki Sato, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 15/054,223

(22) Filed: Feb. 26, 2016

(65) Prior Publication Data
US 2016/0269577 A1 Sep. 15, 2016

(30) Foreign Application Priority Data
Mar. 12, 2015 (JP) .................................. 2015-049969

(51) Int. Cl.
*H04N 1/00* (2006.01)
*H04W 4/80* (2018.01)
(Continued)

(52) U.S. Cl.
CPC ..... *H04N 1/00307* (2013.01); *H04N 1/00411* (2013.01); *H04W 4/80* (2018.02);
(Continued)

(58) Field of Classification Search
None
See application file for complete search history.

(56) References Cited

U.S. PATENT DOCUMENTS

| 5,481,249 A | 1/1996 | Sato ......................... 340/825.06 |
| 6,043,902 A | 3/2000 | Sato ............................. 358/434 |

(Continued)

FOREIGN PATENT DOCUMENTS

| JP | 2012160917 A | 8/2012 |
| JP | 2014-120173 | 6/2014 |

OTHER PUBLICATIONS

Getting Started with Bluetooth Low Energy: Tools and Techniques for Low-Power Networking—by Kevin Townsend, Carles Cufi and Akiba Robert Davidson, translated by Bun Mizuhara, O'Reilly Japan Inc, Japan, Feb. 25, 2015, Edition 1, pp. 011-013, 0024, 040-041, 046-048.
(Continued)

*Primary Examiner* — Sm A Rahman
*Assistant Examiner* — Dae Kim
(74) *Attorney, Agent, or Firm* — Venable LLP

(57) ABSTRACT

An information processing apparatus (MFP) performs communication control for receiving an advertisement (ADV) packet transmitted from a mobile terminal while regularly transmitting an ADV packet that includes service information regarding a service provided by the information processing apparatus, in conformity with the BLE standard. In this state, every time the MFP detects an ADV packet that designates the information processing apparatus as a communication partner in BLE communication, the MFP performs communication control for transmitting a connection request to the mobile terminal that is the transmission source of the ADV packet as a response to the detected ADV packet. The MFP thus serves as a master to establish a BLE connection with each mobile terminal.

14 Claims, 11 Drawing Sheets

(51) Int. Cl.
*H04W 48/10* (2009.01)
*H04W 84/20* (2009.01)
*H04W 8/00* (2009.01)
*H04W 76/14* (2018.01)

(52) U.S. Cl.
CPC ........... *H04W 8/005* (2013.01); *H04W 48/10* (2013.01); *H04W 84/20* (2013.01); *H04N 2201/0032* (2013.01); *H04N 2201/0094* (2013.01); *H04W 76/14* (2018.02)

(56) References Cited

U.S. PATENT DOCUMENTS

| | | | |
|---|---|---|---|
| 6,047,288 A | 4/2000 | Kurosawa et al. | 707/9 |
| 6,286,034 B1 | 9/2001 | Sato et al. | 709/204 |
| 2010/0056054 A1* | 3/2010 | Yamato | H04W 52/50 455/41.2 |
| 2013/0326495 A1* | 12/2013 | Reunamaki | G06F 8/65 717/173 |
| 2014/0168688 A1 | 6/2014 | Sato | 358/1.14 |
| 2014/0169599 A1* | 6/2014 | Solum | H04R 25/554 381/315 |
| 2014/0323048 A1* | 10/2014 | Kang | H04W 4/80 455/41.2 |
| 2014/0328210 A1* | 11/2014 | Knaappila | H04W 56/0015 370/254 |
| 2015/0173018 A1* | 6/2015 | Tomida | H04W 52/0229 455/41.3 |
| 2015/0245369 A1* | 8/2015 | Heydon | H04L 43/065 370/329 |
| 2016/0072855 A1* | 3/2016 | Palin | H04L 65/1069 709/219 |
| 2016/0134709 A1* | 5/2016 | Savolainen | H04L 67/16 370/338 |
| 2016/0278006 A1* | 9/2016 | Lee | H04W 76/10 |
| 2016/0278151 A1* | 9/2016 | Kwon | G08C 23/04 |

OTHER PUBLICATIONS

Japanese Office Action issued in corresponding Japanese Application No. 2015/049969 dated Oct. 9, 2018.
Japanese Office Action issued in corresponding Japanese Application No. 2015049969 dated Feb. 25, 2019.

* cited by examiner

FIG. 11A

TYPES OF ADV PACKET

| PDU TYPE | DESCRIPTION |
|---|---|
| ADV_IND | ABLE TO BE CONNECTED |
| ADV_DIRECT_IND | ABLE TO BE CONNECTED ONLY FROM SPECIFIC COMMUNICATION PARTNER |
| ADV_NONCONN_IND | CONNECTION IMPOSSIBLE |
| ADV_SCAN_IND | ABLE TO MAKE SCAN REQUEST |

FIG. 11B

AuthResult LIST

| AuthResult | MEANING |
|---|---|
| 1 | LOGIN SUCCESSFUL |
| 2 | LOGIN UNSUCCESSFUL |

FIG. 11C

RequestID LIST FOR PRINT SERVICE

| RequestID | MEANING |
|---|---|
| 1 | PRINT JOB DESIGNATED IN RequestParameter |
| 2 | DELETE JOB DESIGNATED IN RequestParameter |
| 3 | MAKE REQUEST TO ACQUIRE PRINT SETTINGS OF JOB DESIGNATED IN RequestParameter |
| 4 | MAKE REQUEST TO CHANGE PRINT SETTINGS OF JOB DESIGNATED IN RequestParameter |

FIG. 11D

RequestID LIST FOR OUTPUT SIZE SETTING

| RequestID | MEANING |
|---|---|
| 1 | A5 |
| 2 | B5 |
| 3 | A4 |
| 4 | B4 |
| 5 | A3 |
| 6 | B3 |

FIG. 11E

RequestID LIST FOR COLOR MODE SETTING

| RequestID | MEANING |
|---|---|
| 1 | MONOCHROME |
| 2 | COLOR |

FIG. 11F

RequestID LIST FOR TWO-SIDED PRINT SETTING

| RequestID | MEANING |
|---|---|
| 1 | SINGLE-SIDED PRINTING |
| 2 | TWO-SIDED PRINTING |

US 10,313,540 B2

INFORMATION PROCESSING APPARATUS, CONTROL METHOD THEREOF, AND STORAGE MEDIUM

BACKGROUND OF THE INVENTION

Field of the Invention

The present invention relates to information processing apparatuses that perform short-range wireless communication, control methods thereof, and storage media.

Description of the Related Art

In recent years, more and more information processing apparatuses having a function of short-range wireless communication such as Bluetooth® communication, including medical apparatuses, domestic appliances, office automation equipment, and the like, conform to the Bluetooth Low Energy (BLE) standard. The BLE is one extension specification of the Bluetooth standards. For example, Japanese Patent Laid-Open No. 2014-120173 discloses a system in which an information processing apparatus uses BLE to provide a service to a mobile terminal.

In a system in which a mobile terminal uses a service of an information processing apparatus such as the system disclosed in Japanese Patent Laid-Open No. 2014-120173, the mobile terminal often finds the information processing apparatus by BLE communication and makes a connection request to the found information processing apparatus. In these cases, the information processing apparatus serves as an advertiser and transmits an advertisement packet conforming to the BLE standard. The information processing apparatus can notify a mobile terminal, which is present therearound, that the information processing apparatus can provide a service, by including information for specifying the service in the advertisement packet and transmitting this packet, for example.

In the case where the mobile terminal uses the service provided by the information processing apparatus that is the transmission source of the advertisement packet, the mobile terminal needs to establish a wireless connection (BLE connection) for BLE communication with this information processing apparatus. In this case, the mobile terminal serves as an initiator and transmits a connection request (CONNECT_REQ) for BLE communication to the information processing apparatus, and can thereby establish a BLE connection and use the service of the information processing apparatus via the established BLE connection. Thus, in the case where the information processing apparatus provides a service to the mobile terminal that is present therearound, a situation is assumed where a plurality of users use their mobile terminals and simultaneously use the service of the information processing apparatus.

However, in a procedure in which a mobile terminal serves as an initiator and establishes a BLE connection as mentioned above, the following problem may occur. Upon a BLE connection being established between a mobile terminal and an information processing apparatus with the aforementioned procedure, communication via the BLE connection is performed while the mobile terminal, which is the initiator, serves as a master and the information processing apparatus, which is an advertiser, serves as a slave. The BLE standard, which is based on the Bluetooth standard, employs a connection mode in which a plurality of slaves can be connected to a single master, and therefore, each slave can only establish a BLE connection with the single master. That is to say, in the case where the information processing apparatus serves as a slave as mentioned above, the information processing apparatus can only establish a BLE connection with a single mobile terminal, and cannot simultaneously establish BLE connections with a plurality of mobile terminals. In this case, the information processing apparatus cannot simultaneously provide a service to a plurality of mobile terminals (mobile terminal devices) using BLE communication (short-range wireless communication).

SUMMARY OF THE INVENTION

The present invention has been made in view of the foregoing problem. The present invention provides a technique that enables an information processing apparatus to simultaneously provide a service to a plurality of mobile terminal devices using short-range wireless communication.

According to one aspect of the present invention, there is provided an information processing apparatus capable of communicating with an external apparatus, comprising: a communication unit configured to operate in a state of being able to receive an advertisement packet transmitted from the external apparatus while transmitting an advertisement packet conforming to a BLE standard; a determination unit configured to determine, if the communication unit receives the advertisement packet, whether or not the information processing apparatus is designated as a destination in the received advertisement packet; and a control unit configured to control, if it is determined by the determination unit that the information processing apparatus is designated as the destination in the received advertisement packet, the communication unit to transmit a connection request to a transmission source of the received advertisement packet in order to establish a BLE connection by serving as a master.

According to another aspect of the present invention, there is provided a method for controlling an information processing apparatus capable of communicating with an external apparatus, the information processing apparatus including a communication unit configured to operate in a state of being able to receive an advertisement packet transmitted from the external apparatus while transmitting an advertisement packet conforming to a BLE standard, the control method comprising: determining, if the communication unit receives the advertisement packet, whether or not the information processing apparatus is designated as a destination in the received advertisement packet; and controlling, if it is determined that the information processing apparatus is designated as the destination in the received advertisement packet, the communication unit to transmit a connection request to a transmission source of the received advertisement packet in order to establish a BLE connection by serving as a master.

According to still another aspect of the present invention, there is provided a non-transitory computer-readable storage medium storing a computer program for causing a computer to execute a method for controlling an information processing apparatus capable of communicating with an external apparatus, the information processing apparatus including a communication unit configured to operate in a state of being able to receive an advertisement packet transmitted from the external apparatus while transmitting an advertisement packet conforming to a BLE standard, the control method comprising: determining, if the communication unit receives the advertisement packet, whether or not the information processing apparatus is designated as a destination in the received advertisement packet; and controlling, if it is determined that the information processing apparatus is designated as the destination in the received advertisement packet, the communication unit to transmit a connection request to a transmission source of the received advertisement packet in order to establish a BLE connection by serving as a master.

According to the present invention, the information processing apparatus can simultaneously provide a service to a plurality of mobile terminal devices using short-range wireless communication.

Further features of the present invention will become apparent from the following description of exemplary embodiments with reference to the attached drawings.

BRIEF DESCRIPTION OF THE DRAWINGS

FIGS. 11A to 11F are diagrams showing various exemplary tables used in BLE communication.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Configuration of Information Processing System>

Figure 1:
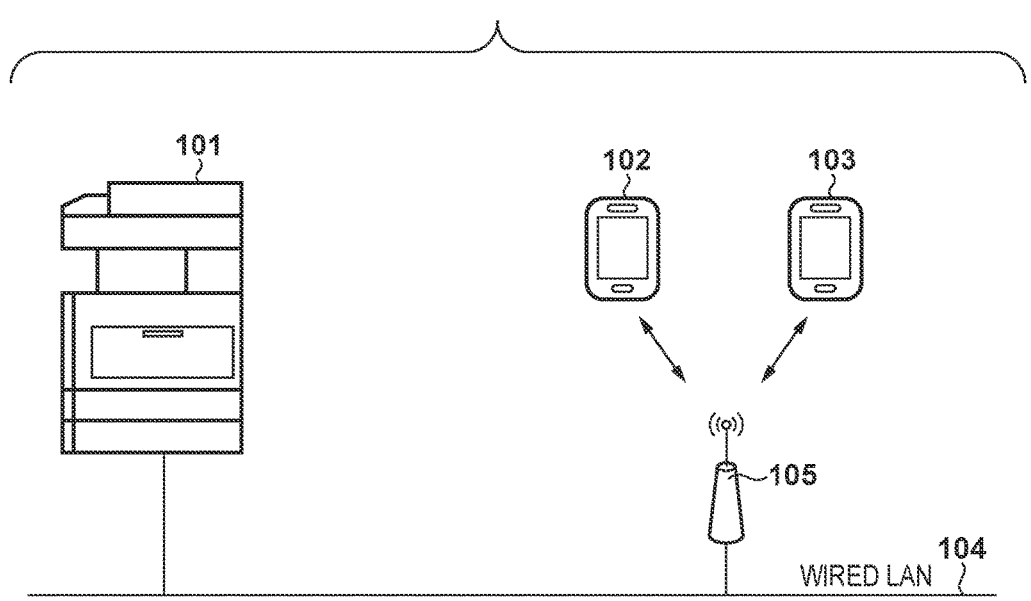
FIG. 1 is a diagram showing an exemplary configuration of an information processing system.

FIG. 1 is a diagram showing an exemplary configuration of an information processing system according to an embodiment of the present invention. In the information processing system, an arbitrary number of MFPs may be present as exemplary information processing apparatuses. Also, an arbitrary number of mobile terminals may be present as exemplary mobile terminal devices capable of communicating with the information processing apparatuses. FIG. 1 shows, as an example, an information processing system including a single MFP 101 and two mobile terminals 102 and 103. Such a system is constructed in an office environment where each user carries a single mobile terminal, and the plurality of users use the mobile terminals and share the single MFP, for example.

In the information processing system shown in FIG. 1, the MFP 101 and a wireless router 105 are connected to a wired LAN 104. The MFP 101 can communicate with other devices connected to the wired LAN 104. The mobile terminals 102 and 103 can be connected to the wired LAN 104 by being wirelessly connected to the wireless router 105 in conformity with the wireless LAN (WLAN) standard, for example. The mobile terminals 102 and 103 can thereby communicate with other devices connected to the wired LAN 104.

The MFP 101 and the mobile terminals 102 and 103 have a communication function (BT communication function) that conforms to the Bluetooth® (hereinafter referred to as "BT") standard, in addition to the WLAN standard. For this reason, the mobile terminals 102 and 103 can perform communication (BT communication) directly with the MFP 101 conforming to the BT standard by establishing a wireless connection (BT connection) with the MFP 101 in conformity with the BT standard. Furthermore, the MFP 101 and the mobile terminals 102 and 103 also have a communication function (BLE communication function) that conforms to the Bluetooth Low Energy (BLE) standard, which is one of the extension specifications of the BT standard, and is a standard for performing communication with lower power consumption than in the BT standard. Accordingly, the mobile terminals 102 and 103 can also perform communication (BLE communication) directly with the MFP 101 conforming to the BLE standard by establishing a wireless connection (BLE connection) with the MFP 101 in conformity with the BLE standard. In the present embodiment, BL communication and BLE communication are examples of short-range wireless communication.

<Hardware configuration of MFP>

Figure 2A:
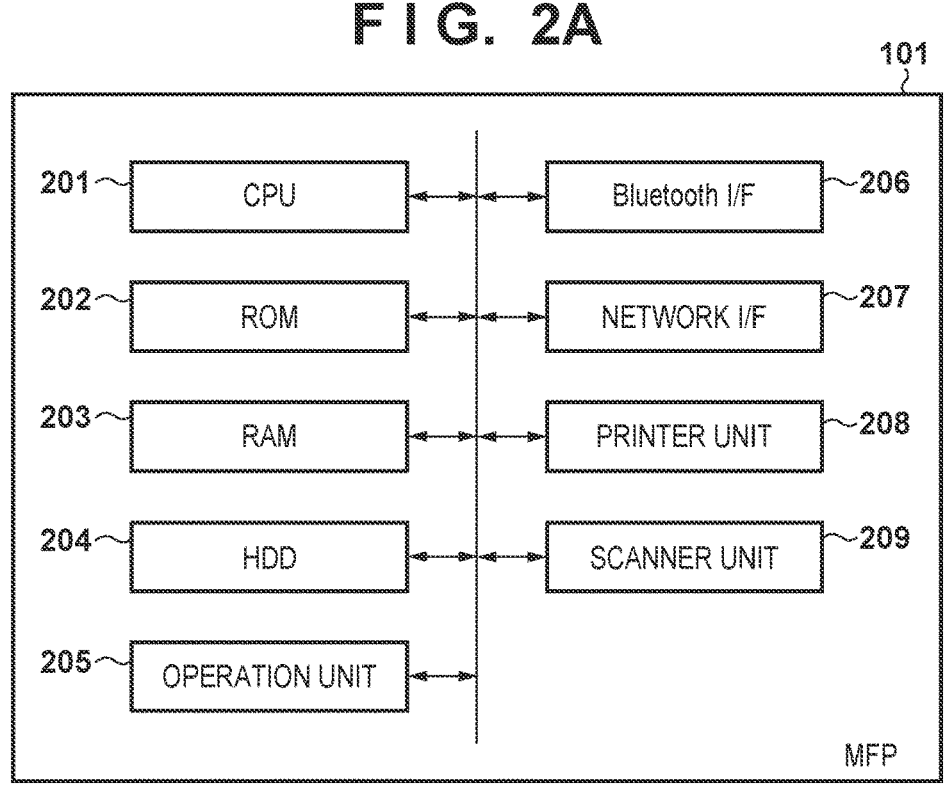
FIG. 2A is a block diagram showing an exemplary hardware configuration of an MFP.

FIG. 2A is a block diagram showing an exemplary hardware configuration of the MFP 101. The MFP 101 includes a CPU 201, a ROM 202, a RAM 203, a HDD 204, an operation unit 205, a BT I/F 206, a network I/F 207, a printer unit 208, and a scanner unit 209, and these devices are connected to an internal bus. The devices connected to the internal bus can communicate with one another via this internal bus.

The CPU 201 controls overall operation of the MFP 101. The CPU 201 performs various kinds of control such as reading control and transmission control by reading out and executing a control program stored in the ROM 202. The RAM 203 is a volatile storage device, and is used as a work area for the CPU 201 executing various programs, or as a temporary storage area in which various data is temporarily stored. The HDD 204 is a nonvolatile storage device, and various data, such as image data, or various programs are stored therein.

The operation unit 205 includes a display that operates as a touch panel on which a user can perform a touch operation with their fingers. The network I/F 207 is an NIC (Network Interface Card) for connecting to the wired LAN 104, and communicates with an external apparatus that is connected to the wired LAN 104. The printer unit 208 prints an image on a sheet based on image data that is received via the internal bus. The scanner unit 209 reads an image on an original to generate image data, and transmits the image data to other devices via the internal bus.

The BT I/F 206 is an exemplary communication interface for performing short-range wireless communication, and wirelessly communicates with an external apparatus in conformity with the BT standard. The MFP 101 can wirelessly communicate, using the BT I/F 206, with external apparatuses such as the mobile terminals 102 and 103 that similarly have BT I/Fs, in conformity with the BT standard. Note that, in this specification, wireless communication (BT communication) conforming to the BT standard also includes wireless communication (BLE communication) conforming to the BLE standard, which is an extension specification of the BT standard.

<Hardware Configuration of Mobile Terminal>

Figure 2B:
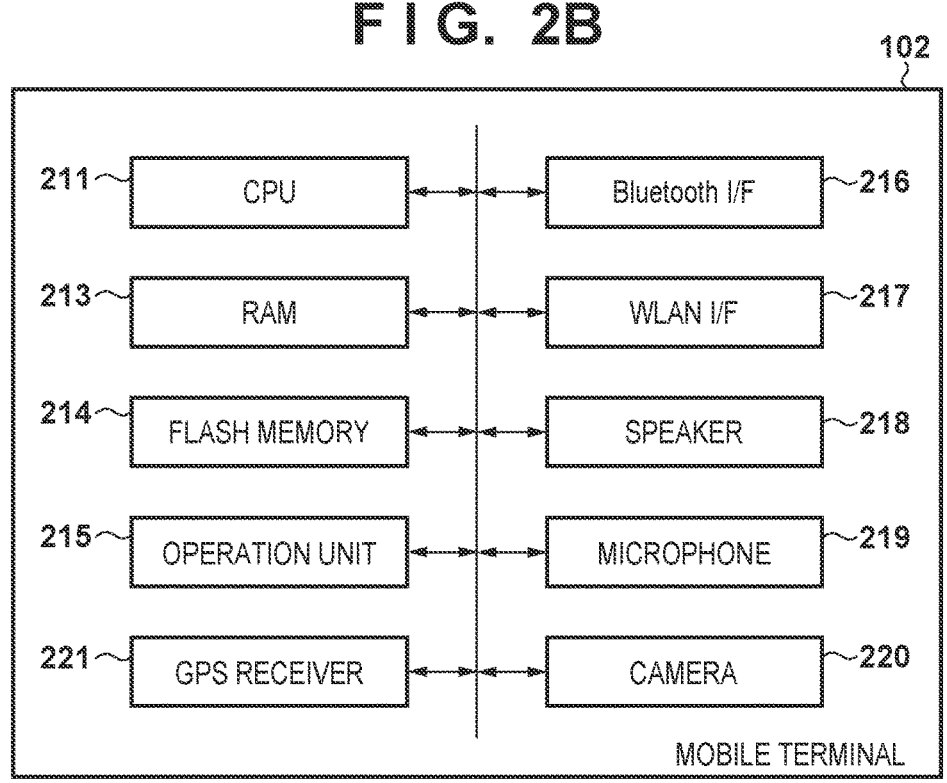
FIG. 2B is a block diagram showing an exemplary hardware configuration of a mobile terminal.

FIG. 2B is a block diagram showing an exemplary hardware configuration of the mobile terminal 102. The mobile terminal 102 includes a CPU 211, a RAM 213, a flash memory 214, an operation unit 215, a BT I/F 216, a WLAN I/F 217, a speaker 218, a microphone 219, a camera 220, and a GPS receiver 221, and these devices are connected to an internal bus. The devices connected to the internal bus can communicate with one another via this internal bus. Note that although the configuration and operations of the mobile terminal 102 will be described below, the same applies to the mobile terminal 103.

The CPU 211 controls overall operation of the mobile terminal 102 by reading out and executing a control program stored in the flash memory 214. The RAM 213 is a volatile storage device, and is used as a work area for the CPU 211 executing various programs, or as a temporary storage area in which various data is temporarily stored. The flash memory 214 is a nonvolatile storage device, and various data or various programs are stored therein.

The operation unit 215 includes a display that operates as a touch panel on which a user can perform a touch operation with their fingers. The speaker 218 converts an audio signal into sound and outputs the sound to the outside. The microphone 219 detects sound, converts the sound into an audio signal, and outputs the audio signal to the internal bus. The camera 220 shoots a still image or a moving image, converts the still image or moving image into electronic data, and outputs this electronic data. The GPS (Global Positioning System) receiver 221 is a receiver for receiving a GPS signal.

The BT I/F 216 is an exemplary communication interface for performing short-range wireless communication, and wirelessly communicates with an external apparatus in conformity with the BT standard. The mobile terminal 102 can wirelessly communicate, using the BT I/F 216, with external apparatuses such as the MFP 101 that similarly has a BT I/F, in conformity with the BT standard. The WLAN I/F 217 is an interface that wirelessly communicates with an external apparatus in conformity with the WLAN standard, and can be wirelessly connected to the wireless router 105, for example.

<Software configuration of MFP 101>

Figure 3A:
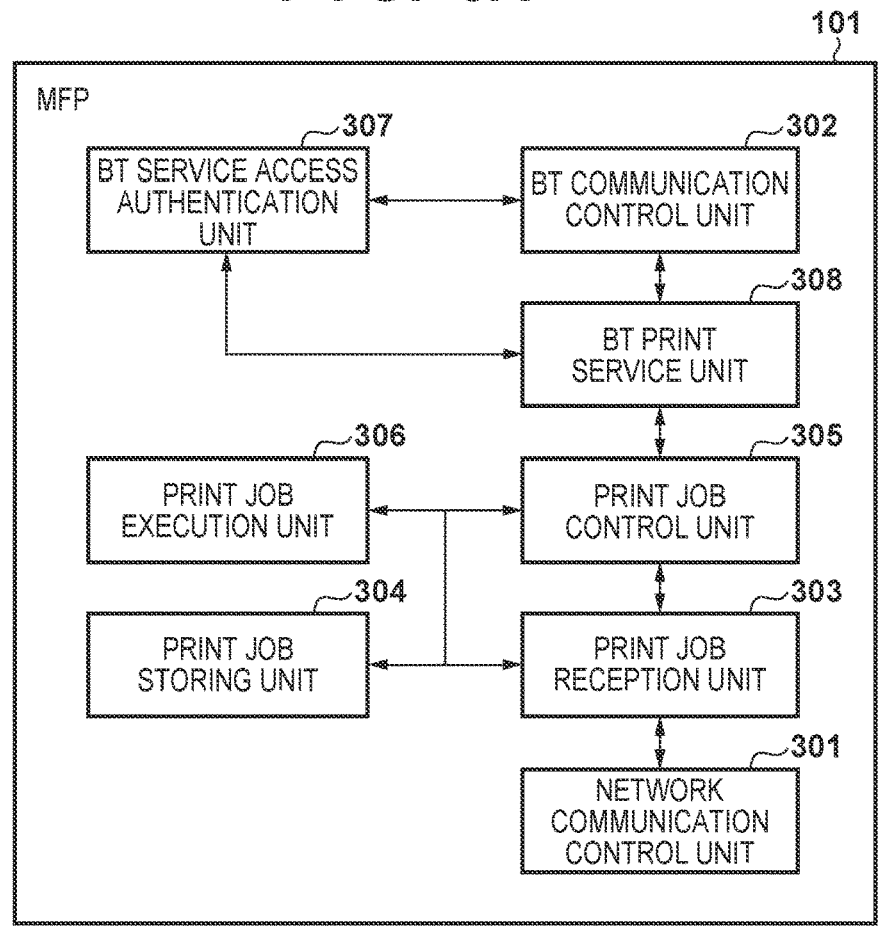
FIG. 3A is a block diagram showing an exemplary software configuration of the MFP.

FIG. 3A is a block diagram showing an exemplary software configuration of the MFP 101. Each part shown in FIG. 3A is achieved on the MFP 101 by the CPU 201 reading out and executing a program stored in a storage device such as the ROM 202 or the HDD 204.

A network communication control unit 301 controls the network I/F 207 to communicate with an external apparatus. A BT communication control unit 302 controls the BT I/F 206 to perform BT communication (BLE communication) with an external apparatus. A print job reception unit 303 uses the network communication control unit 301 to perform processing for receiving a print job that is transmitted from an external apparatus such as a PC or a mobile terminal with which the MFP 101 can communicate via the wired LAN 104. A print job storing unit 304 is a data area that corresponds to the storage area of the RAM 203 or the HDD 204, and a print job that is received by the print job reception unit 303 is stored in the print job storing unit 304.

A print job control unit 305 controls processing related to the print job stored in the print job storing unit 304 in accordance with a request from a BT print service unit 308. For example, the print job control unit 305 acquires the print job stored in the print job storing unit 304, changes print settings for the print job, executes the print job, or deletes the print job. A print job execution unit 306 executes the print job by causing the printer unit 208 to execute printing in accordance with the print job stored in the print job storing unit 304. Thus, in the case where the MFP 101 executes a print job, the MFP 101 functions as a printing apparatus capable of executing print processing.

A BT service access authentication unit 307 performs authentication processing (login/logout processing) for accepting access to a service (hereinafter also referred to as a "BT service") that is disclosed to an external apparatus by BT communication (BLE communication). In the present embodiment, the MFP 101 discloses a service (hereinafter also referred to as a "BT print service") for receiving a print job from an external apparatus by BT communication (BLE communication) and executing the received print job.

The BT print service unit 308 provides a BT print service. The BT print service unit 308 communicates with an external apparatus such as the mobile terminal 102 via the BT communication control unit 302. Furthermore, the BT print service unit 308 can acquire the print job stored in the print job storing unit 304 via the print job control unit 305, and change print settings for the print job, or execute or delete the print job.

<Software Configuration of Mobile Terminal 102>

Figure 3B:
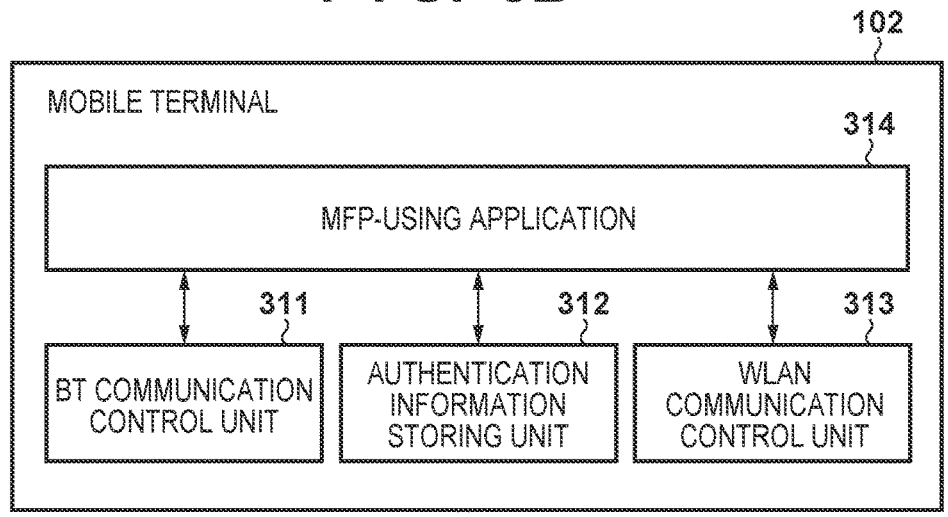
FIG. 3B is a block diagram showing an exemplary software configuration of the mobile terminal.

FIG. 3B is a block diagram showing an exemplary software configuration of the mobile terminal 102. Each part shown in FIG. 3B is achieved on the mobile terminal 102 by the CPU 211 reading out and executing a program stored in a storage device such as the flash memory 214.

A BT communication control unit 311 controls the BT I/F 216 to perform BT communication (BLE communication) with an external apparatus. An authentication information storing unit 312 is a data area that corresponds to the storage area of the flash memory 214, and authentication information including a user name and a password is stored in the authentication information storing unit 312. A WLAN communication control unit 313 controls the WLAN I/F 217 to communicate with an external apparatus.

Various applications are installed in advance in the mobile terminal 102, and one of these applications is an MFP-using application 314. The MFP-using application 314 can establish a BT connection (BLE connection) with the MFP 101 via the BT communication control unit 311 and use the BT print service of the MFP 101 by BT communication (BLE communication).

<Summary of BLE Communication>

Next, a summary of BLE communication performed between the MFP 101 and the mobile terminal 102 will be described. In the case where the BLE communication function is activated, BLE devices having the BLE communication function, such as the MFP 101 and the mobile terminal 102, operate in any of the following five states.

Standby State (Standby):

The standby state is an initial state where packets are not transmitted or received, and the BLE device in the standby state can transition to an advertising state, a scanning state, or an initiating state.

Advertising State (Advertising):

The advertising state is a state in which the BLE devise serves as an advertiser and transmits an advertisement packet (hereinafter also referred to as an ADV packet in some cases) at predetermined time intervals to the vicinity of the BLE device. Note that a type (PDU type) shown in FIG. 11A is defined in each ADV packet.

Scanning State (Scanning):

The scanning state is a state in which the BLE device serves as a scanner to receive the ADV packet in order to find a BLE device that is operating as an advertiser and is present therearound.

Initiating state (Initiating):

The initiating state is a state in which the BLE device serves as an initiator to transmit a connection request (CONNECT_REQ) to an advertiser that is the transmission source of a received ADV packet, and a BLE device in the initiating state transitions to a connected state together with the advertiser as a result of establishing a BLE connection.

Connected state (Connection):

The connected state is a state in which the BLE device has established a BLE connection, and a BLE device in the connected state performs data communication based on the GATT profile (Generic Attribute Profile).

A BLE device in the connected state plays either a master role or a slave role. In the case where a BLE device transitions from the initiator state to the connected state, this BLE device operates as a master. On the other hand, in the case where a BLE device transitions from the advertising state (advertiser) to the connected state, this BLE device operates as a slave. The master can establish BLE connections with a plurality of slaves. The slave can only establish a BLE connection with a single master.

A BLE device can also simultaneously perform BLE communication with a plurality of devices. For example, when a BLE device is performing BLE communication with a device in the connected state, this BLE device can transmit an ADV packet in the advertising state through BLE communication with another device. However, a BLE device that is operating as a master cannot simultaneously operate as a slave. A BLE device that is operating as a slave cannot simultaneously operate as a master either.

In this embodiment, the MFP 101 activates the BLE communication function via the BT communication control unit 302 and performs the following BLE communication.

The MFP 101 serves as an advertiser and transmits ADV packets (ADV_IND and ADV_NONCONN_IND) at predetermined time intervals.

The MFP 101 serves as a scanner to receive ADV packets, thereby finding an advertiser.

The MFP 100 transmits a connection request (CONNECT_REQ) to an advertiser, serves as a master to transition to the connected state, and performs data communication.

The MFP 101 receives a connection request (CONNECT_REQ) from an initiator, serves as a slave to transition to the connected state, and performs data communication.

The mobile terminal 102 activates the BLE communication function via the BT communication control unit 311 and performs the following BLE communication.

The mobile terminal 102 serves as a scanner to receive ADV packets, thereby finding an advertiser.

The mobile terminal 102 serves as an advertiser to transmit an ADV packet (ADV_DIRECT_IND) that designates a specific communication partner (destination), at predetermined time intervals.

The mobile terminal 102 receives a connection request (CONNECT_REQ) from an initiator, serves as a slave to transition to the connected state, and performs data communication.

The mobile terminal 102 transmits a connection request (CONNECT_REQ) to an advertiser, serves as a master to transition to the connected state, and performs data communication.

<BT Service Provided by MFP 101>

Figure 4:
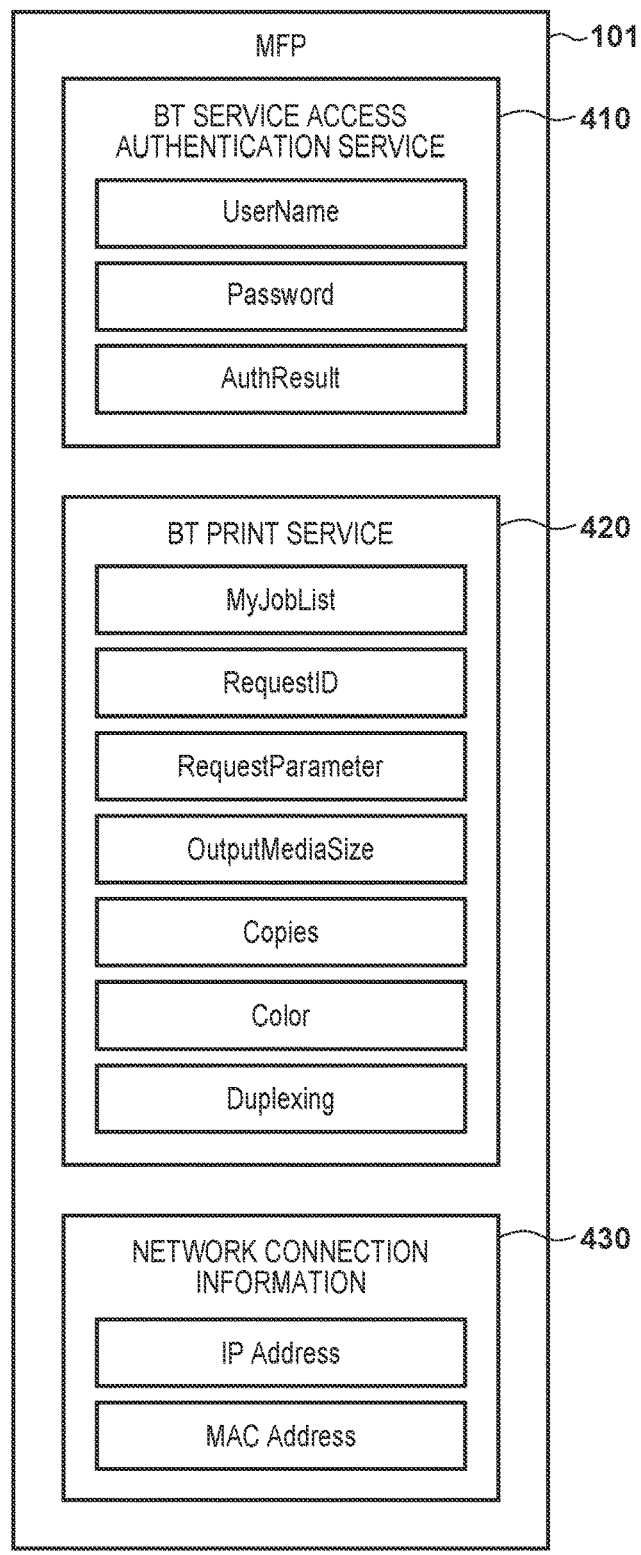
FIG. 4 is a diagram showing an exemplary BT service included in the MFP.

FIG. 4 is a diagram showing an exemplary BT service that the MFP 101 has. In the MFP 101, a BT service access authentication service 410, a BT print service 420, and network connection information 430 are defined as the GATT profile. The MFP 101, upon establishing a BT connection (BLE connection) with the mobile terminal 102, discloses the above GATT profile that is defined in advance to the mobile terminal 102.

(BT Service Access Authentication Service 410)

The BT service access authentication service 410 includes the following characteristics. The BT service access authentication unit 307 reads and writes values of the respective characteristics based on BLE communication via the BT communication control unit 302.

UserName:

UserName is a characteristic in which a user name is written from the mobile terminal 102 when the mobile terminal 102 starts to use a service provided by the MFP 101.

Password:

Password is a characteristic in which a password is written from the mobile terminal 102 when the mobile terminal 102 starts to use a service provided by the MFP 101. Note that encryption may be required when the password is written.

AuthResult:

AuthResult is a characteristic in which a result of user authentication performed by the MFP 101 in accordance with an authentication request from the mobile terminal 102 (i.e., whether or not user authentication was successful) is stored, and for example, values shown in FIG. 11B are stored thereas. The BT communication control unit 302 notifies the connected mobile terminal 102 of the authentication result upon the authentication result being stored.

(BT Print Service 420)

The BT print service 420 corresponds to a service that can be used from the mobile terminal 102 after the user authentication that is based on the BT service access authentication service 410 is successful. The BT print service 420 includes the following characteristics. The BT print service unit 308 reads and writes values of the respective characteristics based on BLE communication via the BT communication control unit 302.

MyJobList:

An identifier(s) of one or more print jobs is stored in MyJobList, the print jobs being associated with a user who has been successfully authenticated by the BT service access authentication unit 307, from among print jobs that have been stored in the print job storing unit 304 via the print job control unit 305.

This characteristic is read by the mobile terminal 102 via a BLE connection.

RequestID:

RequestID is a characteristic written by the mobile terminal 102 via a BLE connection when the mobile terminal 102 makes a request for processing related to a print job to the MFP 101, and values shown in FIG. 11C are stored thereas, for example. The BT print service unit 308 notifies the print job control unit 305 of RequestID written by the mobile terminal 102. The print job control unit 305 thereby performs processing corresponding to RequestID (processing shown in FIG. 11C).

RequestParameter:

RequestParameter is a characteristic written by the mobile terminal 102 via a BLE connection when the mobile terminal 102 makes a request for processing related to a print job to the MFP 101, and an identifier of the print job to be processed is stored thereas, for example. Note that the mobile terminal 102 writes an identifier of a print job acquired from MyJobList in RequestParameter via a BLE connection.

For example, in the case where "3" is written in RequestID, print settings for the print job corresponding to the identifier stored as RequestParameter are stored in the following characteristics by the BT print service unit 308. For OutputMediaSize, an ID that indicates an output paper size setting, such as IDs shown in FIG. 11D, is stored. For Copies, a numeric value that indicates the number of copies set is stored. For Color, an ID that indicates a color mode setting, such as IDs shown in FIG. 11E, is stored. For Duplexing, an ID that indicates a setting of two-sided printing, such as IDs shown in FIG. 11F, is stored. These characteristics are read and written by the mobile terminal 102 via a BLE connection.

(Network Connection Information 430)

The network connection information 430 is configured as a service that can be used from the mobile terminal 102 after user authentication at the BT service access authentication service 410 is successful. The network connection information 430 includes the following characteristics.

IP Address:

IP Address is a characteristic in which an IP address used in communication via the wired LAN 104 by the MFP 101 is stored, and is read by the mobile terminal 102.

MAC Address:

MAC Address is a characteristic in which a MAC address of the network I/F 207 in the MFP 101 is stored, and is read by the mobile terminal 102.

Note that the characteristics of the network connection information 430 are used by the mobile terminal 102 to establish a WLAN connection with the wireless router 105 and to be connected to the MFP 101 via the wireless router 105 and the wired LAN 104.

<BLE Connection Procedure in MFP>

Figure 5:
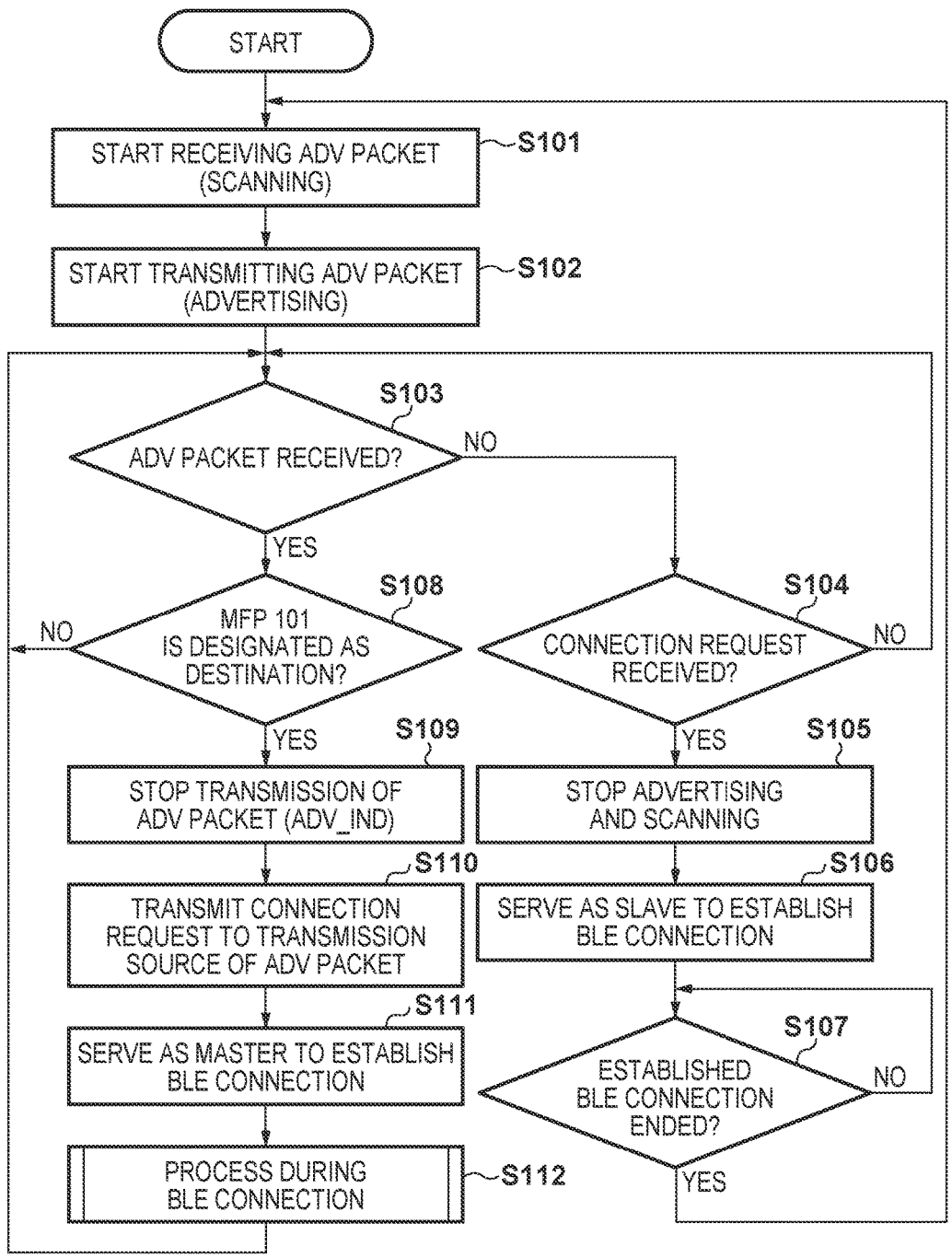
FIG. 5 is a flowchart showing a BLE connection procedure executed by the MFP.

FIG. 5 is a flowchart showing a BLE connection procedure executed by the MFP 101. Note that processing in each step shown in FIG. 5 is achieved on the MFP 101 by the CPU 201 reading out and executing a program stored in a storage device such as the ROM 202 or the HDD 204.

Upon the BT and BLE communication functions of the MFP 101 being activated, in step S101, the CPU 201 (BT communication control unit 302) causes the BT I/F 206 to start scan processing for receiving an ADV packet transmitted from an external apparatus (mobile terminal). Furthermore, in step S102, the CPU 201 causes the BT I/F 206 to start advertising processing for serving as an advertiser and transmitting an ADV packet at predetermined time intervals (i.e., regularly). The ADV packet is a packet that includes service information indicating a service provided by the MFP 101.

The BT I/F 206 can transmit an ADV packet of a PDU type shown in FIG. 11A. In the advertising processing started in step S102, two types of ADV packets, namely ADV_IND and ADV_NONCONN IND are transmitted. The ADV packet (ADV_IND) indicates that, when a connection request (CONNECT_REQ) is received from an external apparatus (mobile terminal) as a response to the transmitted ADV packet, this connection request can be accepted. The ADV packet (ADV_NONCONN_IND) indicates that, when a connection request (CONNECT_REQ) is received from an external apparatus (mobile terminal) as a response to the transmitted ADV packet, this connection request cannot be accepted. That is to say, the ADV packet (ADV_NONCONN_IND) is purposed only for advertising of service information to a mobile terminal around the MFP 101.

The aforementioned two types of ADV packets (ADV_IND and ADV_NONCONN_IND) transmitted in the advertising processing include the following information.

Local Name:

Local Name is the name of a device (e.g., "Oanon MFP CXXX").

Adv Address:

Adv Address is a device address of the advertiser, and corresponds to identification information of the MFP 101. In this embodiment, a device address assigned to the BT I/F 206 is set thereas.

TX Power Level:

TX Power Level is the level of transmitted power (intensity of transmitted power), and a value of -38 [dBm] is set thereas, for example.

Service UUID:

Service UUID indicates a service (function) provided by the MFP 101, and in this embodiment, a UUID indicating that the MFP 101 provides the BT print service is set thereas. Note that the UUID corresponding to the BT print service is predetermined such that the MFP 101 and the MFP-using application 314 of the mobile terminal 102 can both recognize this UUID.

Thus, the BT I/F 206 enters a state of receiving the ADV packet transmitted from a mobile terminal while regularly transmitting an ADV packet including the UUID that indicates the service provided by the MFP 101. That is to say, the MFP 101 starts to operate in the advertising state and the scanning state.

After step S102, in step S103, the CPU 201 determines whether or not an ADV packet has been received (from the mobile terminal) by the BT I/F 206, advances the processing to step S104 if not received, and advances the processing to step S108 if received. In step S104, the CPU 201 determines whether or not a connection request (CONNECT_REQ) has been received from the mobile terminal by the BT I/F 206, returns the processing to step S103 if not received, and advances the processing to step S105 if received.

The processing in steps S105 to S107 is processing by which the MFP 101 serves as a slave to perform BLE communication with the mobile terminal (e.g., mobile terminal 102) that is the transmission source of the connection request (CONNECT_REQ). Specifically, in step S105, the CPU 201 causes the BT I/F 206 to stop the advertising processing and the scan processing, and in step S106, the CPU 201 causes the BT I/F 206 to establish a BLE connection with the mobile terminal that is the transmission source. The BT I/F 206 serves as a slave to establish a BLE connection by transmitting a response packet in response to the received connection request (CONNECT_REQ).

In the case where the MFP 101 holds a BLE connection that has been established by the MFP 101 serving as a slave, the MFP 101 cannot additionally establish a BLE connection. For this reason, in the MFP 101, the advertising processing and the scan processing are stopped until the BLE connection is ended (disconnected). In step S107, the CPU 201 determines whether or not the established BLE connection has ended, and if the CPU 201 determines that the established BLE connection has ended, the CPU 201 returns the processing to step S101. As a result, in steps S101 and 5102, the scan processing and the advertising processing are resumed.

On the other hand, if an ADV packet is received (from the mobile terminal) and the processing is advanced from step S103 to step S108, the CPU 201 determines whether or not the received ADV packet (received advertisement packet) is an ADV packet that designates the MFP 101 as a communication partner (destination) in BLE communication. This ADV packet is a packet whose PDU type shown in FIG. 11A is ADV_DIRECT_IND. In this embodiment, the ADV packet (ADV_DIRECT_IND) includes the following information.

Adv Address:

Adv Address is a device address of the advertiser, and if the ADV packet is transmitted from the mobile terminal 102, a device address assigned to the BT I/F 216 is set thereas.

Init Address:

Init Address is a device address of the initiator, and identification information indicating a communication partner in BLE communication is set thereas.

TX Power Level:

TX Power Level is the level of transmitted power (intensity of transmitted power), and a value of −38 [dBm] is set thereas, for example.

In the case where the identification information of the MFP 101 (i.e., the device address assigned to the BT I/F 206) is included as Init Address in the ADV packet (ADV_DIRECT_IND), it is indicated that the MFP 101 is designated as a communication partner in BLE communication. In this case, the CPU 201 determines that the MFP 101 is designated as a communication partner in BLE communication and advances the processing to step S109, and in other cases, the CPU 201 returns the processing to step S103. Thus, the CPU 201 detects the ADV packet that designates the MFP 101 as a communication partner in BLE communication, from the ADV packets received by the BT I/F 206. Here, it is assumed that the ADV packet (ADV DIRECT IND) that is transmitted from the mobile terminal 102 and includes the identification information of the MFP 101 is detected.

In step S109, the CPU 201 causes the BT I/F 206 to stop transmission of the ADV packet (ADV_IND) of the ADV packets that are being transmitted in the advertising processing. As a result, thereafter, transmission of only the ADV packet (ADV_NONCONN_IND) is continued as the advertising processing. Next, in step S110, the CPU 201 controls the BT I/F 206 to transmit a connection request (CONNECT_REQ) to the mobile terminal (mobile terminal 102) that is the transmission source of the ADV packet as a response to the detected ADV packet (ADV_DIRECT_IND). As a result, in step S111, the CPU 201 causes the BT I/F 206 to serve as a master to establish a BLE connection with the mobile terminal 102. The BLE connection established between the MFP 101 and the mobile terminal 102 can be used by the MFP 101 to provide a service (BT print service as described later, in the present embodiment) to the mobile terminal 102.

This case results in the mobile terminal 102 serving as a slave to establish a BLE connection with the MFP 101. Thus, the mobile terminal 102 can connect to the MFP 101 by transmitting the ADV packet (ADV IND) that includes the identification information (device address) of the MFP 101 and is included in the ADV packets which include the UUID indicating the service provided by the MFP 101. Specifically, the mobile terminal 102 transmits the ADV packet (ADV_IND) that designates the MFP 101 as a communication partner in BLE communication, and receives the connection request transmitted from the MFP 101 as a response to this packet. The mobile terminal 102 can thereby serve as a slave to establish a BLE connection with the MFP 101.

As described above, the MFP 101 continues the advertising processing for transmitting the ADV packet (ADV_NONCONN_IND) at predetermined time intervals (i.e., regularly) and the scan processing even after establish the BLE connection with the mobile terminal 102 by serving as a master. This is because, if the MFP 101 holds a BLE connection established by the MFP 101 serving as a master, the MFP 101 can serve as a master to additionally establish a BLE connection with another mobile terminal, but cannot serve as a slave to additionally establish a BLE connection. That is to say, the MFP 101 maintains a state of being able to serve as a master to establish BLE connections with other mobile terminals by transmitting the ADV packet (ADV_NONCONN_IND) to notify mobiles terminals around the MFP 101 of the service provided by the MFP 101. On the other hand, the MFP 101 notifies mobile terminals therearound that the MFP 101 will not accept the connection requests (CONNECT_REQ), thereby notifying these mobile terminals that the MFP 101 cannot serve as a slave to establish BLE connections with other mobile terminals.

After completing the processing in step S111, the CPU 201 advances the processing to step S112. In step S112, the CPU 201 executes, as processing during the BLE connection (with the mobile terminal 102), processing for simultaneously establishing BLE connections with a plurality of mobile terminals including the mobile terminal 102 through a procedure shown in FIG. 6.

<Procedure of processing (S112) during BLE connection>

Figure 6:
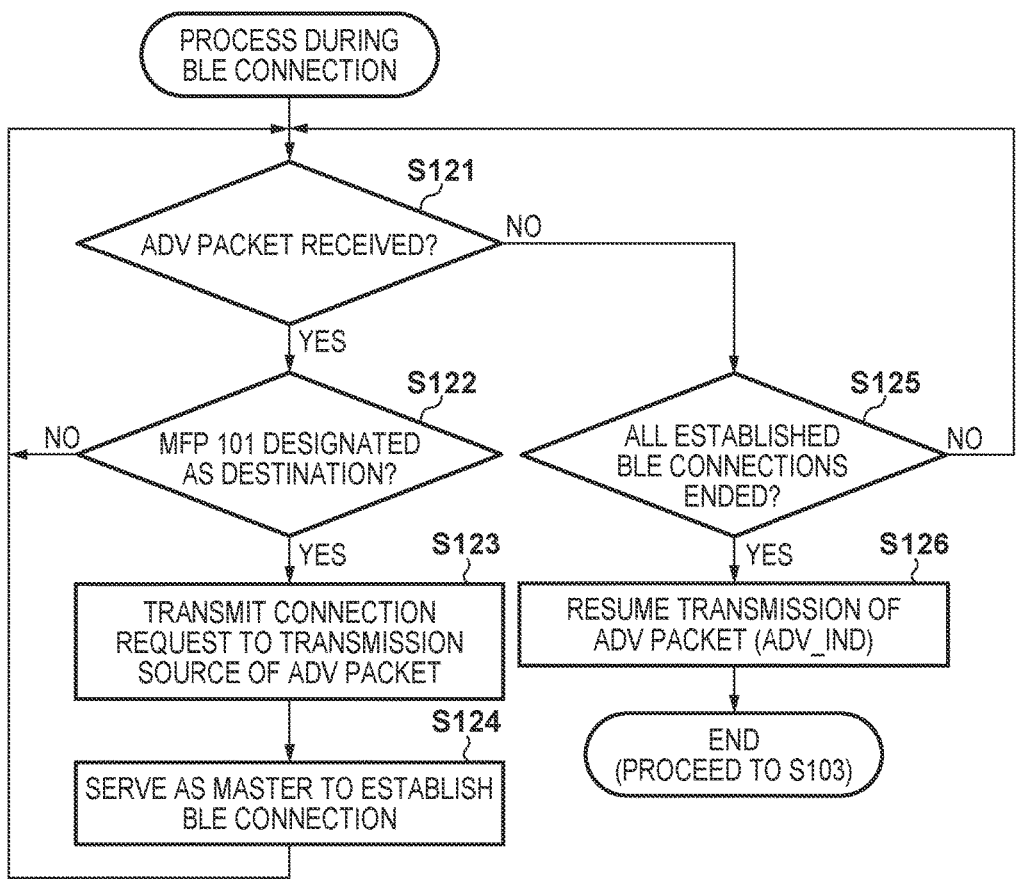
FIG. 6 is a flowchart showing a processing procedure in step S112 in FIG. 5.

FIG. 6 is a flowchart showing a procedure of the processing in step S112 in FIG. 5. Processing in steps S121 to S124 is processing by which, in a state where a BLE connection with the mobile terminal 102 has been established while the MFP 101 is serving as a master, the MFP 101 further establishes BLE connections with other mobile terminals (i.e., establishes BLE connections with a plurality of mobile terminals). Initially, in step S121, the CPU 201 determines whether or not an ADV packet has been received (from a mobile terminal) by the BT I/F 206, advances the processing to step S125 if not received, and advances the processing to step S122 if received.

Processing in steps S122 to S124 is the same as processing in steps S108, S110, and S111, respectively. In step S122, the CPU 201 determines whether or not the received ADV packet is an ADV packet that designates the MFP 101 as a communication partner in BLE communication. Note that such an ADV packet is the ADV packet (ADV_DIRECT_IND) as in step S108. Based on the determination in step S122, the CPU 201 advances the processing to step S123 if such an ADV packet has been detected, and returns the processing to step S121 if not detected.

In step S123, the CPU 201 controls the BT I/F 206 to transmit, as a response to the detected ADV packet (ADV_DIRECT_IND), a connection request (CONNECT_REQ) to the mobile terminal that is the transmission source of this ADV packet. Thereby, in step S124, the CPU 201 causes the BT I/F 206 to serve as a master to establish a BLE connection with the mobile terminal 102. Thereby, in a state where a (first) BLE connection with the mobile terminal 102 has been established, the CPU 201 further establishes a (second) BLE connection with another mobile terminal.

Thereafter, the CPU 201 returns the processing to step S121, and repeats the processing in steps S123 and 5124 every time the ADV packet that designates the MFP 101 as a communication partner in BLE communication is detected. With this processing, the CPU 201 can establish a plurality of BLE connections with a plurality of mobile terminals.

On the other hand, in the case of advancing the processing from step S121 to step S125, the CPU 201 determines whether or not all of one or more established BLE connections have ended, advances the processing to step S126 if it is determined that all BLE connections have ended, and returns the processing to step S121 in other cases. In step S126, the CPU 201 causes the BT I/F 206 to resume transmission of the ADV packet (ADV IND) that was stopped in step S109, and ends the processing in step S112. As a result, the processing proceeds to step S103.

Thus, in this embodiment, the CPU 201 in the MFP 101 performs communication control for receiving the ADV packets transmitted from mobile terminals while regularly transmitting the ADV packets including the service information regarding the service provided by the MFP 101, in conformity with the BLE standard. In this state, every time the CPU 201 detects the ADV packet that designates the MFP 101 as a communication partner in BLE communication, the CPU 201 performs communication control for transmitting the connection request to the mobile terminal that is the transmission source of the ADV packet as a response to the detected ADV packet. The CPU 201 thus serves as a master to establish a BLE connection with each mobile terminal. The established BLE connection can be used to provide a service to the connected mobile terminals.

That is to say, with the processing procedures shown in FIGS. 5 and 6, the MFP 101 can serve as a master to simultaneously establish a plurality of BLE connections with a plurality of mobile terminals while serving as an advertiser to notify mobile terminals that are present around the MFP 101 of the information regarding the service provided by the MFP 101. The MFP 101 can thereby simultaneously provide the service (e.g., BT print service) to a plurality of mobile terminals using BLE communication via the plurality of established BLE connections.

<BLE Connection Procedure in Mobile Terminal>

Figure 7:
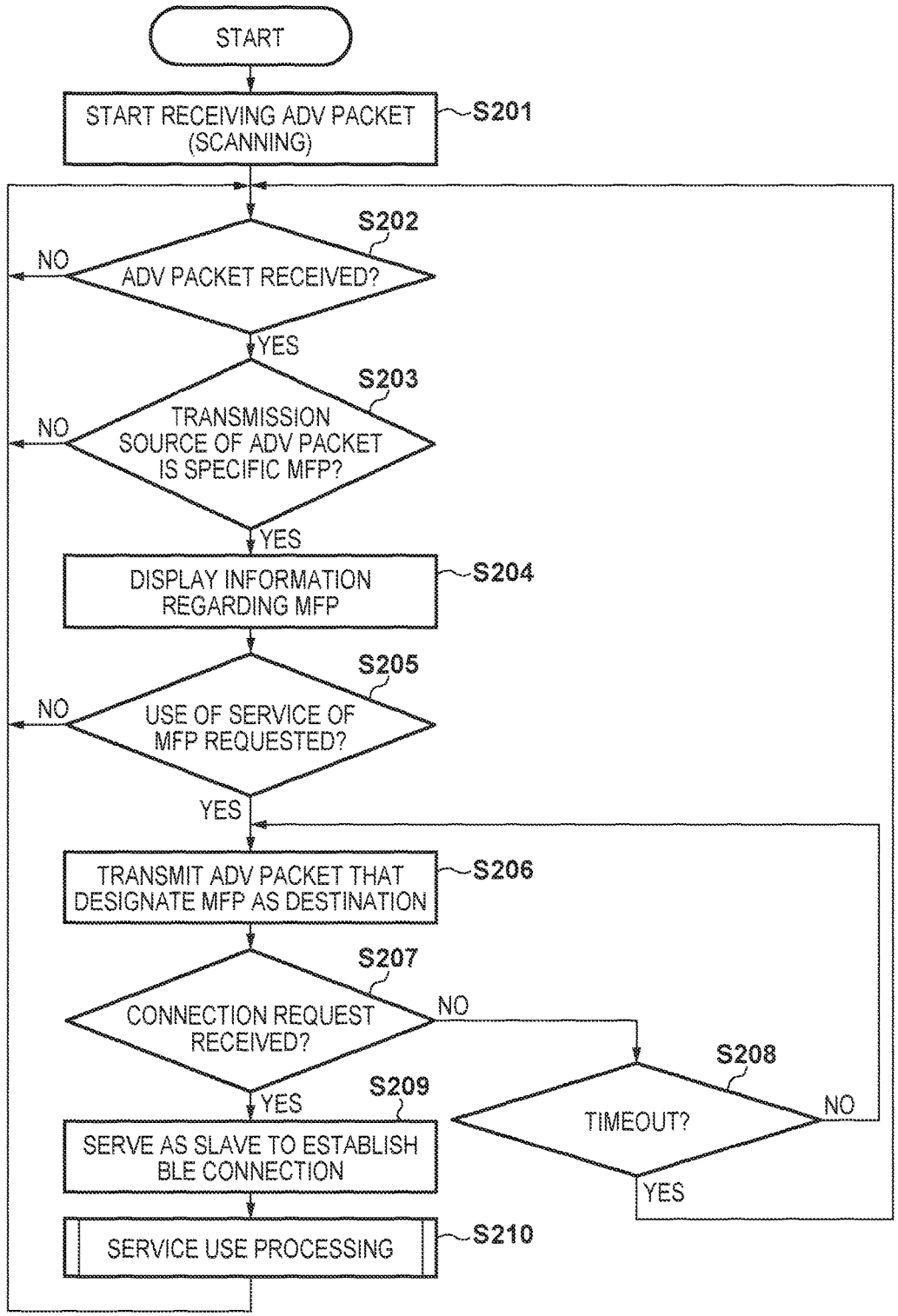
FIG. 7 is a flowchart showing a BLE connection procedure executed by the mobile terminal.

FIG. 7 is a flowchart showing a BLE connection procedure executed by the mobile terminal 102. Note that the processing in each step shown in FIG. 7 is achieved on the mobile terminal 102 by the CPU 211 reading out and executing a program stored in a storage device such as the flash memory 214. When the mobile terminal 102 approaches the MFP 101 to an extent that the mobile terminal 102 can perform BLE communication therewith (i.e., when the mobile terminal 102 approaches an area where the mobile terminal 102 can perform BLE communication therewith), the BT I/F 216 in the mobile terminal 102 can receive the ADV packets transmitted from the BT I/F 206 in the MFP 101.

In the mobile terminal 102, the BT and BLE communication functions are activated upon the MFP-using application 314 being initiated. Upon the BT and BLE communication functions of the mobile terminal 102 being activated, in step S201, the CPU 211 (MFP-using application 314) causes the BT I/F 216 to start the scan processing for receiving the ADV packet transmitted from an external apparatus (MFP 101).

Next, in step S202, the CPU 211 determines whether or not the ADV packet has been received by the BT I/F 216, and advances the processing to step S203 only if received. In step S203, the CPU 211 analyzes the ADV packet and determines whether or not the transmission source of the received ADV packet is a specific MFP. Specifically, the CPU 211 detects an ADV packet whose values of Local Name, Manufacturer Specific Data, and Service UUID indicate a service that the user of the mobile terminal 102 can be presented with, from among ADV packets whose PDU type is ADV_IND or ADV_NONCONN_IND. If the CPU 211 detects such an ADV packet, the CPU 211 determines that the transmission source of the received ADV packet is a specific MFP and advances the processing to step S204, and in other cases, the CPU 211 ignores the received ADV packet and returns the processing to step S202.

Figure 8:
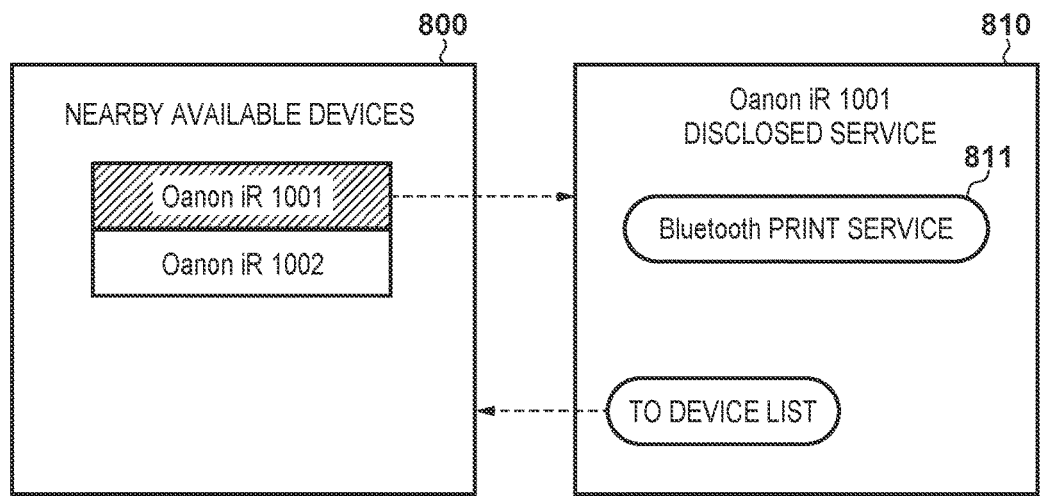
FIG. 8 is a diagram showing an exemplary operation screen displayed on the mobile terminal.

In step S204, the CPU 211 displays information regarding the MFP on the operation unit 215 based on the information included in the received ADV packet, and accept a user operation. In step S204, for example, the CPU 211 displays an operation screen 800 (FIG. 8) that shows a list of usable devices (MFPs) based on Local Name included in the ADV packet. Upon any MFP being selected in the operation screen 800 by the user, an operation screen 810 including information that indicates the service provided by this MFP and associated with Service UUID included in the ADV packet and is displayed. On the operation screen 810, "BT print service", which is the service provided by the MFP ("Oanon iR 1001"), is indicated as a selection button 811.

Next, in step S205, the CPU 211 determines whether or not a request for use of the service of the MFP has been made by the user using the operation screen such as the operation screen 800 or 810 (e.g., the selection button 811 has been pressed). If a request for use of the service of the MFP has been made (i.e., the service to be used has been indicated) by the user, the CPU 211 advances the processing to step S206, and in other cases, the CPU 211 returns the processing to step S202. Thus, in steps S202 to 5205, the CPU 211 detects the ADV packet transmitted from the specific MFP (here, MFP 101) that provides the service to be used.

In step S206, the CPU 211 controls the BT I/F 216 to transmit an ADV packet (ADV_DIRECT_IND) that designates the aforementioned specific MFP (MFP 101) as the communication partner in BLE communication as a response to the received ADV packet. The CPU 211 thereby makes a request for use of the service to the MFP 101. This ADV packet (ADV_DIRECT_IND) is a packet received and detected by the processing in steps S103 and 5108 in the MFP 101, and includes the following information.

Adv Address:

Adv Address is a device address of the advertiser, and a device address assigned to the BT I/F 216 is set thereas.

Init Address:

Init Address is a device address of the initiator, and a value of Adv Address included in the ADV packet received in step S202 is set as identification information indicating a communication partner in BLE communication.

TX Power Level:

TX Power Level is the level of transmitted power (intensity of transmitted power), and a value of -38 [dBm] is set thereas, for example.

Thereafter, the CPU 211 controls the BT I/F 216 to receive a connection request (CONNECT_REQ) transmitted from the specific MFP (MFP 101) as a response to the ADV packet (ADV_DIRECT_IND) transmitted in step S206. In step S207, the CPU 211 determines whether or not such a connection request has been received, and if received, the CPU 211 advances the processing to step S209.

On the other hand, if such a connection request has not been received, next, in step S208, the CPU 211 determines whether or not a timeout time has elapsed, and if the timeout time has not elapsed, the CPU 211 returns the processing to step S206. The CPU 211 thereby continues retransmission of the ADV packet (ADV_DIRECT_IND) until the timeout time elapses. On the other hand, if the timeout time has elapsed, the CPU 211 returns the processing from step S208 to step S202, thereby ending the request for use of the service, and continues the ADV packet scan processing.

In step S209, the CPU 211 causes the BT I/F 216 to serve as a slave to establish a BLE connection with the specific MFP (MFP 101). Thereafter, in step S210, the CPU 211 executes service use processing for using the service of the MFP 101 by using the BLE connection established between the MFP 101 and the mobile terminal 102 through a procedure shown in FIG. 9. After the service use processing ends, the CPU 211 returns the processing to step S202 and continues the ADV packet scan processing.

Thus, in the present embodiment, the CPU 211 in the mobile terminal 102 performs communication control for receiving the ADV packet that is transmitted from the MFP and includes the service information regarding the service provided by this MFP, in conformity with the BLE standard. In this state, the CPU 211 performs processing for detecting the ADV packet transmitted from the specific MFP (MFP 101) that provides the service to be used, from among the received ADV packets. In accordance with the detection of such an ADV packet, the CPU 211 performs communication control for transmitting the ADV packet that designates the specific MFP as a communication partner in BLE communication, and receiving the connection request transmitted from the specific MFP as a response to the transmitted ADV packet. The CPU 211 thereby serves as a slave to establish a BLE connection with the specific MFP. The established BLE connection can be used to use the service of the connected MFP.

<Procedure of Service use Processing>

Figure 9:
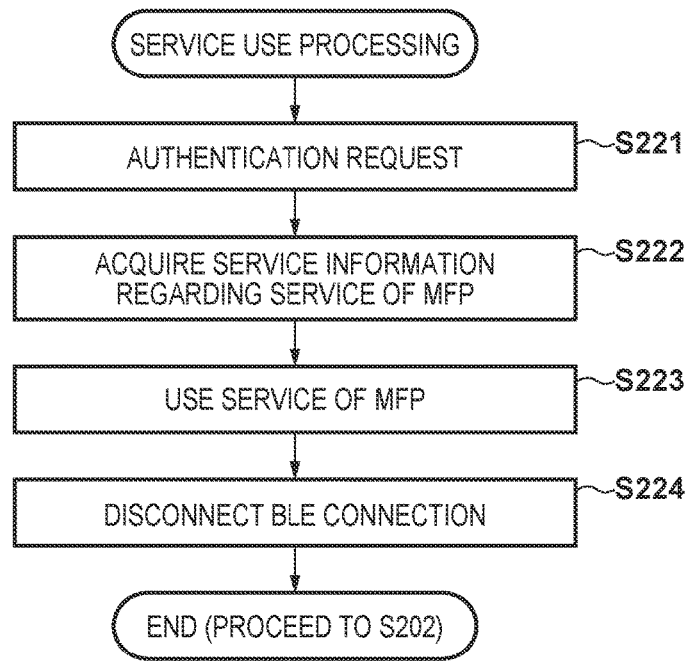
FIG. 9 is a flowchart showing a processing procedure in step S210 in FIG. 7.

FIG. 9 is a flowchart showing a procedure of the processing in step S210 in FIG. 7. Initially, in step S221, upon the CPU 211 receiving a request for use of the service (here, BT print service), the CPU 211 makes an authentication request for using this service to the MFP 101 via the BLE connection. Specifically, the CPU 211 writes values stored in the authentication information storing unit 312 as the characteristics UserName and Password in the BT service access authentication service 410 of the MFP 101. As a result of user authentication based on these characteristics, the mobile terminal 102 is notified of the value of AuthResult from the MFP 101.

If the user authentication is successful, in step S222, the CPU 211 acquires the service information regarding the service of the MFP 101. Note that, as a result of successful user authentication, access to the GATT profile of the BT print service 420 and the network connection information 430 is permitted by the MFP 101.

Next, in step S223, the CPU 211 performs processing for using the BT print service based on the acquired service information. For example, the CPU 211 displays a list of print jobs associated with the authenticated user on the operation unit 215, and accepts a user operation. Furthermore, the CPU 211 makes a request to execute processing that corresponds to the user operation (e.g., a change of print settings for a print job, or execution or deletion of a print job) to the MFP 101 via the BLE connection.

In the case of ending the use of the service of the MFP 101 in accordance with the user operation, in step S224, the CPU 211 ends the BLE connection established between the mobile terminal 102 and the MFP 101, and ends the service use processing.

<Exemplary use of BT Print Service>

Figure 10:
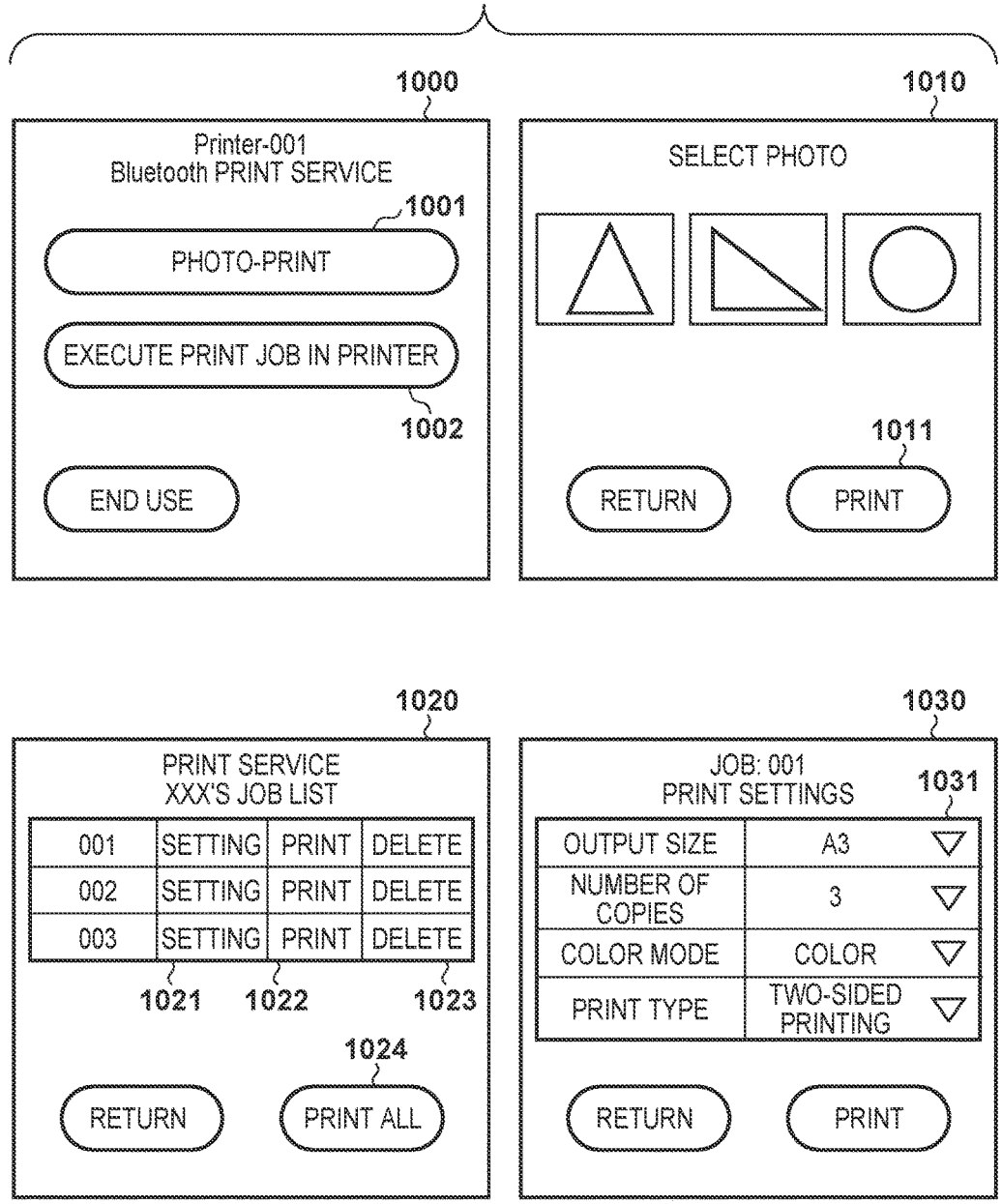
FIG. 10 is a diagram showing exemplary operation screens displayed by an MFP-using application in the mobile terminal.

An example where the mobile terminal 102 uses the BT print service provided by the MFP 101 will be described below with reference to FIG. 10. A menu screen 1000 in FIG. 10 is displayed on the operation unit 215 by the CPU 211 (MFP-using application 314) if the selection button 811 is pressed in the operation screen 810 by the user (YES in S205). At this time, the CPU 211 serves as a slave to establish a BLE connection with the MFP 101 (S209). Buttons 1001 and 1002 to give the instructions "Photo-print" and "Execute print job in printer" are displayed in the menu screen 1000.

(Photo-print)

If the button 1001 in the menu screen 1000 is pressed, the display screen of the operation unit 215 transitions to a screen 1010. The screen 1010 is used to give instructions to select a photo stored in the mobile terminal 102 and to execute printing of the selected photo. Upon the user selecting a desired photo and pressing a print button 1011 on the screen 1010, the CPU 211 acquires, by BLE communication, the characteristics of the network connection information 430 that is the GATT profile disclosed by the MFP 101.

Furthermore, the CPU 211 controls the WLAN I/F 217 so as to establish a WLAN connection with the wireless router 105 and be connected to the MFP 101 via the wireless router 105 and the wired LAN 104, based on the acquired characteristics. Thus, the CPU 211 causes the MFP 101 to execute a print job by transmitting the print job for printing the selected photo to the MFP 101 via the wireless router 105 and the wired LAN 104. Note that, in the case where the MFP 101 has a WLAN communication function, the CPU 211 may cause the WLAN I/F 217 to not be connected to the wireless router 105 but to be directly connected to the MFP 101 via a WLAN and transmit the print job.

(Execution of Print Job in MFP)

If the button 1002 in the menu screen 1000 is pressed, the display screen of the operation unit 215 transitions to a screen 1020. In this case, the CPU 211 displays the screen 1020 showing a list of print jobs by reading, by BLE communication, MyJobList in the characteristics of the BT print service 420 disclosed by the MFP 101. In the screen 1020, setting 1021, print 1022, and delete 1023 can be selected as processing for each print job.

If the setting 1021 in the screen 1020 is selected, the CPU 211 writes an identifier of the corresponding print job in RequestParameter of the BT print service 420 by BLE communication. Furthermore, the CPU 211 writes a value of 3 (FIG. 11C), which indicates a request to acquire setting information regarding the print job, in RequestID of the BT print service 420. Thereafter, the CPU 211 acquires print settings for the print job by reading OutputMediaSize, Copies, Color, and Duplexing of the BT print service 420, and displays a print setting screen 1030 on the operation unit 215 based on the acquired information. Print settings 1031 can be changed in the print setting screen 1030, and the mobile terminal 102 instructs the MFP 101 of the content to be changed by BLE communication.

If the print 1022 in the screen 1020 is selected for any print job, the CPU 211 writes the identifier of the corresponding print job in RequestParameter of the BT print service 420. Furthermore, the CPU 211 writes a value of 1 (FIG. 11C) indicating a request to execute the print job in RequestID of the BT print service 420.

If print all 1024 in the screen 1020 is selected, the CPU 211 writes identifiers of all print jobs in RequestParameter of the BT print service 420. Furthermore, the CPU 211 writes a value of 1 (FIG. 11C), which indicates a request to execute the print job, in RequestID of the BT print service 420.

If the delete 1023 in the screen 1020 is selected for a print job, the CPU 211 writes an identifier of the corresponding print job in RequestParameter of the BT print service 420. Furthermore, the CPU 211 writes a value of 2 (FIG. 11C), which indicates a request to delete the print job, in RequestID of the BT print service 420.

The MFP 101 thus executes requested processing for a print job designated by the mobile terminal 102 (MFP-using application 314) via a BLE connection established between the MFP 101 and the mobile terminal 102.

Other Embodiments

The embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-049969, filed Mar. 12, 2015, which is hereby incorporated by reference herein in its entirety.

What is claimed is:

1. A control method for an information processing apparatus capable of performing Bluetooth LE communication, the control method comprising:
    scanning a first type of advertisement packet conforming to the Bluetooth LE, that is transmitted from an external apparatus and indicates to be connectable with a specific communication partner, while transmitting a second type of advertisement packet conforming to the Bluetooth LE that indicates to be unable to accept a connection request and includes service information indicating services that the information processing apparatus can provide;
    determining whether or not the information processing apparatus is designated as the connectable specific communication partner in the first type of advertisement packet received as a result of the scanning; and
    transmitting, upon a condition that it is determined that the information processing apparatus is designated as the connectable specific communication partner in the first type of received advertisement packet, a connection request to a transmission source of the first type of received advertisement packet in order to establish a Bluetooth LE connection by serving as a master.

2. The method according to claim 1, further comprising transmitting a third type of advertisement packet, conforming to the Bluetooth LE, that indicates to be able to accept a connection request while transmitting the second type of advertisement packet,
    wherein transmission of the third type of advertisement packet is stopped in at least a period from when the information processing apparatus establishes a Bluetooth LE connection by serving as the master until when all Bluetooth LE connections established by serving as the master are disconnected.

3. The method according to claim 2, further comprising resuming, upon a condition that the Bluetooth LE connection that the information processing apparatus established by serving as the master has ended, transmission of the third type of advertisement packet.

4. The method according to claim 2, further comprising establishing, upon a condition that the information processing apparatus receives a connection request from the external apparatus, a Bluetooth LE connection by serving as a slave.

5. The method according to claim 4, further comprising stopping, upon a condition that the information processing apparatus serves as the slave to establish the Bluetooth LE connection, transmission of both the second type of advertisement packet and the third type of advertisement packet.

6. The method according to claim 5, further comprising resuming, upon a condition that the Bluetooth LE connection that the information processing apparatus established by serving as the slave has ended, transmission of both the second type of advertisement packet and the third type of advertisement packet.

7. The method according to claim 2,
    wherein a value indicating ADV_IND is set to PDU type of the third type of advertisement packet.

8. The method according to claim 2, further comprising continuing transmission of the second type of advertisement packet also in a period when the information processing apparatus establishes a Bluetooth LE connection by serving as the master until when all Bluetooth LE connections established by serving as the master are disconnected.

9. The method according to claim 1,
    wherein the information processing apparatus is a printing apparatus capable of executing print processing.

10. The method according to claim 1, wherein a value indicating ADV_DIRECT_IND is set to PDU type of the first type of advertisement packet,
    wherein a value indicating ADV_NONCONN_IND is set to PDU type of the second type of advertisement packet.

11. The method according to claim 1, further comprising continuing, after establishing the Bluetooth LE connection with the transmission source of the first type of received advertisement packet by serving as the master, scanning of the first type of advertisement packet and transmission of the second type of advertisement packet in order to be able to establish a Bluetooth LE connection with another external apparatus by serving as the master.

12. An information processing apparatus capable of performing Bluetooth LE communication, comprising:
   at least one memory storing instructions; and
   at least one processor that, upon execution of the instructions stored in the at least one memory, performs processing to:
   scan a first type of advertisement packet conforming to the Bluetooth LE, that is transmitted from an external apparatus and indicates to be connectable with a specific communication partner, while transmitting a second type of advertisement packet conforming to the Bluetooth LE standard, that indicates to be unable to accept a connection request and includes service information indicating services that the information processing apparatus can provide;
   determine whether or not the information processing apparatus is designated as the connectable specific communication partner in the first type of advertisement packet received as a result of the scanning; and
   transmit, upon a condition that it is determined that the information processing apparatus is designated as the connectable specific communication partner in the first type of received advertisement packet, the communication unit to transmit a connection request to a transmission source of the received advertisement packet in order to establish a Bluetooth LE connection by serving as a master.

13. A non-transitory computer-readable storage medium storing a computer program for causing a computer to execute a control method for an information processing apparatus capable of performing Bluetooth LE communication, the control method comprising:
   scanning a first type of advertisement packet confirming to the Bluetooth LE, that is transmitted from an external apparatus and indicates to be connectable with a specific communication partner, while transmitting a second type of advertisement packet conforming to the Bluetooth LE standard, that indicates to be unable to accept a connection request and includes service information indicating services that the information processing apparatus can provide;
   determining, whether or not the information processing apparatus is designated as the connectable specific communication partner in the first type of advertisement packet received as a result of the scanning; and
   transmitting, upon a condition that it is determined that the information processing apparatus is designated as the connectable specific communication partner in the first type of received advertisement packet, a connection request to a transmission source of the first type of received advertisement packet in order to establish a Bluetooth LE connection by serving as a master.

14. A method for establishing a Bluetooth LE connection between an information processing apparatus and an external apparatus, the method comprising
   the information processing apparatus:
   scanning a first type of advertisement packet conforming to the Bluetooth LE, that is transmitted from an external apparatus and indicates to be connectable with a specific communication partner, while transmitting a second type of advertisement packet conforming to the Bluetooth LE standard, that indicates to be unable to accept a connection request and includes service information indicating services that the information processing apparatus can provide;
   determining whether or not the information processing apparatus is designated as the connectable specific communication partner in the first type of advertisement packet received as a result of the scanning; and
   transmitting, upon a condition that it is determined that the information processing apparatus is designated as the connectable specific communication partner in the first type of received advertisement packet, a connection request to a transmission source of the first type of received advertisement packet in order to establish a Bluetooth LE connection by serving as a master, and
   the external apparatus:
   receiving the second type of advertisement packet transmitted from the information processing apparatus;
   displaying services that the information processing apparatus can provide, based on the service information included in the second type of received advertisement packet;
   transmitting the first type of advertisement packet in which the information processing apparatus is designated as the connectable specific communication partner, in order to receive a service requested by a user from the displayed services; and
   establishing, upon a condition that the external apparatus receives the connection request from the information processing apparatus, the Bluetooth LE connection by serving as a slave.

* * * * *